US012789116B2

(12) United States Patent
Nakajima

(10) Patent No.: US 12,789,116 B2
(45) Date of Patent: Nov. 10, 2026

(54) FRACTIONATING LIQUID CHROMATOGRAPH AND CONTROL METHOD THEREFOR

(71) Applicant: SHIMADZU CORPORATION, Kyoto (JP)

(72) Inventor: Kosuke Nakajima, Singapore (SG)

(73) Assignee: SHIMADZU CORPORATION, Kyoto (JP)

( * ) Notice: Subject to any disclaimer, the term of this patent is extended or adjusted under 35 U.S.C. 154(b) by 298 days.

(21) Appl. No.: 18/718,163

(22) PCT Filed: Oct. 31, 2022

(86) PCT No.: PCT/JP2022/040722
§ 371 (c)(1),
(2) Date: Jun. 10, 2024

(87) PCT Pub. No.: WO2023/105997
PCT Pub. Date: Jun. 15, 2023

(65) Prior Publication Data

US 2025/0041761 A1 Feb. 6, 2025

(30) Foreign Application Priority Data

Dec. 10, 2021 (SG) ........................... 10202113769U

(51) Int. Cl.
*B01D 15/24* (2006.01)
*G01N 30/02* (2006.01)
(Continued)

(52) U.S. Cl.
CPC ........... *B01D 15/247* (2013.01); *G01N 30/18* (2013.01); *G01N 30/32* (2013.01); *G01N 30/38* (2013.01);
(Continued)

(58) Field of Classification Search
CPC ...... B01D 15/247; G01N 30/18; G01N 30/32; G01N 30/38; G01N 2030/027;
(Continued)

(56) References Cited

U.S. PATENT DOCUMENTS

2011/0184658 A1 7/2011 Maruyama
2017/0322187 A1* 11/2017 Thielsch ................ B01D 15/12
(Continued)

FOREIGN PATENT DOCUMENTS

CN 110455970 A 11/2019
CN 111505173 A * 8/2020 ............. G01N 30/82
(Continued)

OTHER PUBLICATIONS

CN-111505173-A (Year: 2020).*
(Continued)

*Primary Examiner* — Fatemeh Esfandiari Nia
(74) *Attorney, Agent, or Firm* — Muir Patent Law, PLLC

(57) ABSTRACT

A fractionating liquid chromatograph (1) includes a liquid delivery pump (200), a sampler (300) connected to the liquid delivery pump (200), a separation column (400) connected to the sampler (300), and a detector (500) connected to the separation column (400) and the sampler. The sampler (300) includes a needle that suctions or discharges a sample, and a flow path switching valve connected to the needle. The fractionating liquid chromatograph (1) further includes a controller (100) that sets a state of the flow path switching valve to a first state and a second state, the first state being a state in which the needle is connected to a storage unit for storing the sample, the second state being a state in which the needle is connected to the detector.

5 Claims, 16 Drawing Sheets

(51) Int. Cl.

| | |
|---|---|
| ***G01N 30/18*** | (2006.01) |
| ***G01N 30/32*** | (2006.01) |
| ***G01N 30/38*** | (2006.01) |

(52) U.S. Cl.
CPC . *G01N 2030/027* (2013.01); *G01N 2030/326* (2013.01); *G01N 2030/385* (2013.01)

(58) Field of Classification Search
CPC ....... G01N 2030/326; G01N 2030/385; G01N 30/24; G01N 30/80; G01N 2030/022; G01N 30/04; G01N 2030/382; G01N 30/20; G01N 2030/201; G01N 2030/202
See application file for complete search history.

(56) References Cited

U.S. PATENT DOCUMENTS

| | | | | |
|---|---|---|---|---|
| 2020/0333300 | A1* | 10/2020 | Ortmann | B01D 15/163 |
| 2021/0349062 | A1* | 11/2021 | Shagawa | G01N 30/82 |
| 2024/0027407 | A1* | 1/2024 | Shoykhet | G01N 30/20 |

FOREIGN PATENT DOCUMENTS

| | | | | |
|---|---|---|---|---|
| JP | H10-332660 | A | 12/1998 | |
| JP | 2011-033556 | A | 2/2011 | |
| WO | 2010/021008 | A1 | 2/2010 | |
| WO | WO-2020080041 | A1 * | 4/2020 | G01N 30/82 |

OTHER PUBLICATIONS

Office Action from the Indian Patent Office dated Mar. 18, 2026, for corresponding Application No. 202447052249.
Notice of Reasons for Refusal dated Dec. 24, 2024, for corresponding Japanese Patent Application No. 2023-566163.
"Autosampler", [Online]; 2020, Shimadzu Europe GmbH, (accessed Sep. 6, 2021).
PCT Written Opinion of International Searching Authority dated Jan. 10, 2023, for international application No. PCT /JP2022/040722.
Thermo Scientific Dionex, UltiMate 3000 Well Plate Autosampler, catalog, PS70157 _E 09/16S, 2016, pp. 1-12. [online], [retrieval date Dec 15, 2022] URL: https://assets.thermofisher.com/TFS-Assets/CMD/Specification-Sheets/PS-70157-LC-UltiMate-3000-Well-Plate-Autosampler-PS70157-EN.pdf.

* cited by examiner

FRACTIONATING LIQUID CHROMATOGRAPH AND CONTROL METHOD THEREFOR

TECHNICAL FIELD

The present disclosure relates to a liquid chromatography analysis system that fractionates components of a sample introduced into a detector, and also relates to a control method therefor.

BACKGROUND ART

An example liquid chromatograph includes a liquid delivery pump, a sample injector, a separation column, and a detector. An example method of injecting a sample by the sample injector is a loop injection method (partial injection method). A sample injector (e.g., autosampler SIL-10AF manufactured by Shimadzu Corporation (https://www.shimadzu.eu/autosampler (NPL 1))) according to the loop injection method charges a part of a sample measured via a sampling needle into a sample loop, and then injects it into an analysis flow path.

CITATION LIST

Non Patent Literature

NPL 1: "Autosampler", [Online]; 2020, Shimadzu Europe GmbH, (accessed Sep. 6, 2021).

SUMMARY OF INVENTION

Technical Problem

A fractionating liquid chromatograph further includes an automatic fractionation apparatus that fractionates components separated in the separation column, in addition to the configuration of the liquid chromatograph described above. The automatic fractionation apparatus collects an eluate containing components separated in the separation column while dividing the eluate into a plurality of collection containers.

Such a fractionating liquid chromatograph has conventionally been requested to reduce component parts of the apparatus for cost reduction.

Solution to Problem

A fractionating liquid chromatograph according to an aspect of the present disclosure includes a liquid delivery pump, a sampler connected to the liquid delivery pump, a separation column connected to the sampler, and a detector connected to the separation column and the sampler. The sampler includes a needle that suctions or discharges a sample, a flow path switching valve connected to the needle, and a storage unit to store a sample. The fractionating liquid chromatograph further includes a controller that controls the flow path switching valve to switch a state of the flow path switching valve between a first state and a second state, the needle being connected to the storage unit via the flow path switching valve in the first state, the needle being connected to the detector via the flow path switching valve in the second state.

A control method for a fractionating liquid chromatograph according to an aspect of the present disclosure is a control method for a fractionating liquid chromatograph. The fractionating liquid chromatograph includes a liquid delivery pump, a sampler connected to the liquid delivery pump, a separation column connected to the sampler, and a detector connected to the separation column and the sampler. The sampler includes a needle that suctions or discharges a sample, a flow path switching valve connected to the needle, and a storage unit to store a sample. The control method includes: setting a state of the flow path switching valve to a first state to deliver the sample to the separation column, the needle being connected to the storage unit for storing the sample via the flow path switching valve in the first state; and setting the state of the flow path switching valve to a second state to fractionate an eluate from the detector, the needle being connected to the detector via the flow path switching valve in the second state.

DESCRIPTION OF EMBODIMENTS

Figure 1:
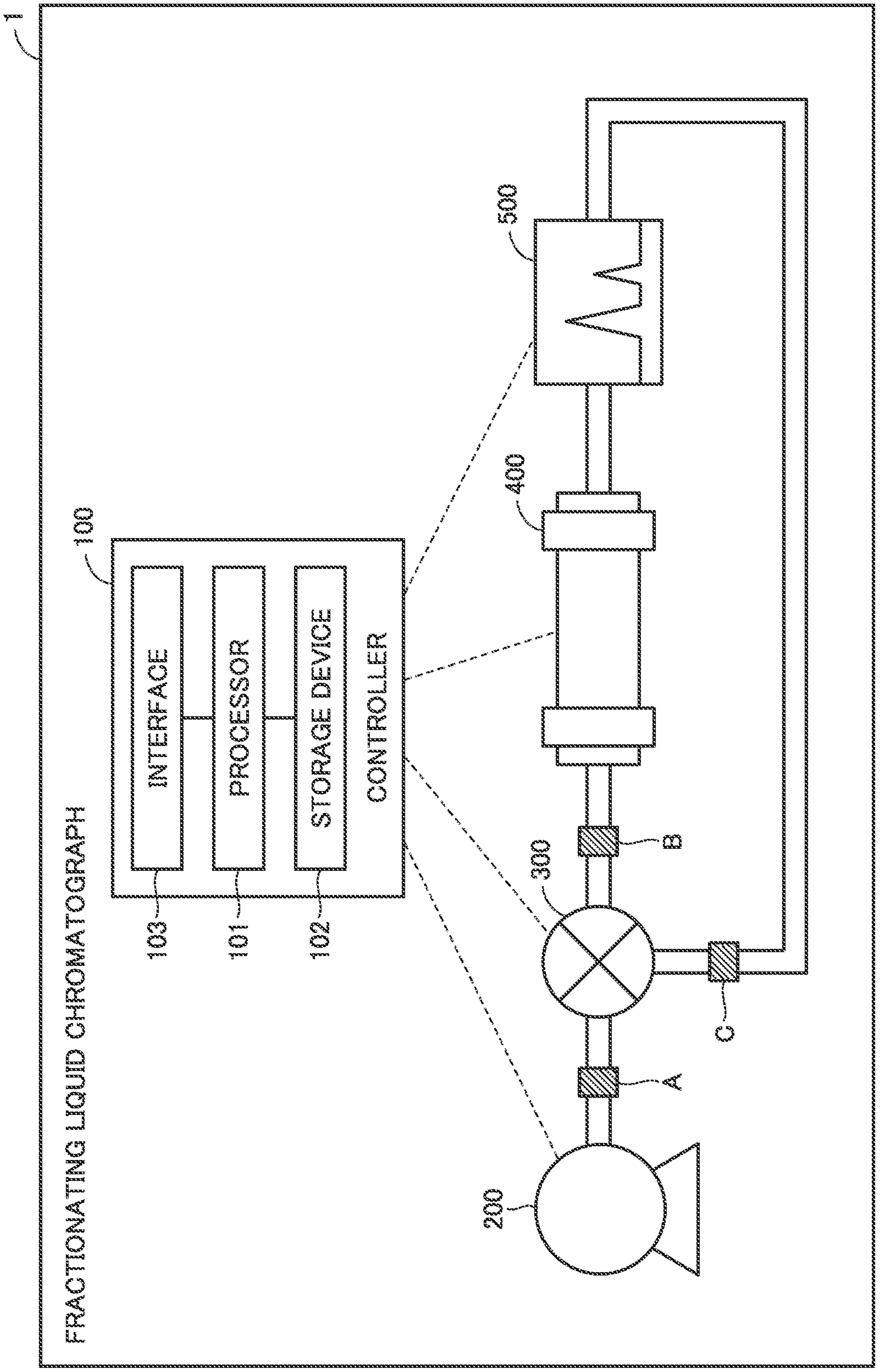
FIG. 1 shows a configuration of a fractionating liquid chromatograph 1.

A fractionating liquid chromatograph according to an embodiment of the present disclosure will be described below in detail with reference to the drawings. The same or corresponding parts in the drawings have the same reference characters allotted, and description thereof will not be repeated.

[Configuration of Fractionating Liquid Chromatograph]

FIG. 1 shows a configuration of a fractionating liquid chromatograph 1. As shown in FIG. 1, fractionating liquid chromatograph 1 includes a controller 100, a liquid delivery pump 200, a sampler 300, a separation column 400, and a detector 500. FIG. 1 shows three points A to C in a flow path connecting these elements. Point A indicates a position between liquid delivery pump 200 and sampler 300. Point B indicates a position between sampler 300 and separation column 400. Point C indicates a position between detector 500 and sampler 300.

Controller 100 controls an operation of fractionating liquid chromatograph 1. Controller 100 includes a processor 101, a storage device 102, and an interface 103. In one example implementation, as processor 101 executes a program stored in storage device 102, controller 100 controls the operation of fractionating liquid chromatograph 1. Processor 101 may execute a program stored in a recording medium detachable from controller 100. Interface 103 is implemented by a communication interface (e.g., network card). Via interface 103, processor 101 communicates with any other element (such as sampler 300) in fractionating liquid chromatograph 1, or communicates with a device external to fractionating liquid chromatograph 1.

Liquid delivery pump 200 supplies a solution used as a mobile phase toward separation column 400.

Sampler 300 supplies an analysis sample toward separation column 400. Sampler 300 further supplies an eluate from detector 500 to a fractionation container.

Separation column 400 is supplied with the sample together with the mobile phase, thereby separating a target component included in the sample. Separation column 400 is accommodated in a column oven (not shown) and is maintained at a temperature set by an analysis method in the column oven.

Detector 500 analyzes the sample supplied from separation column 400. Detector 500 is implemented by, for example, an ultraviolet visible spectrophotometer, a diode array detector, and/or a differential refractive index detector.

[Configuration of Sampler]

Figure 2:
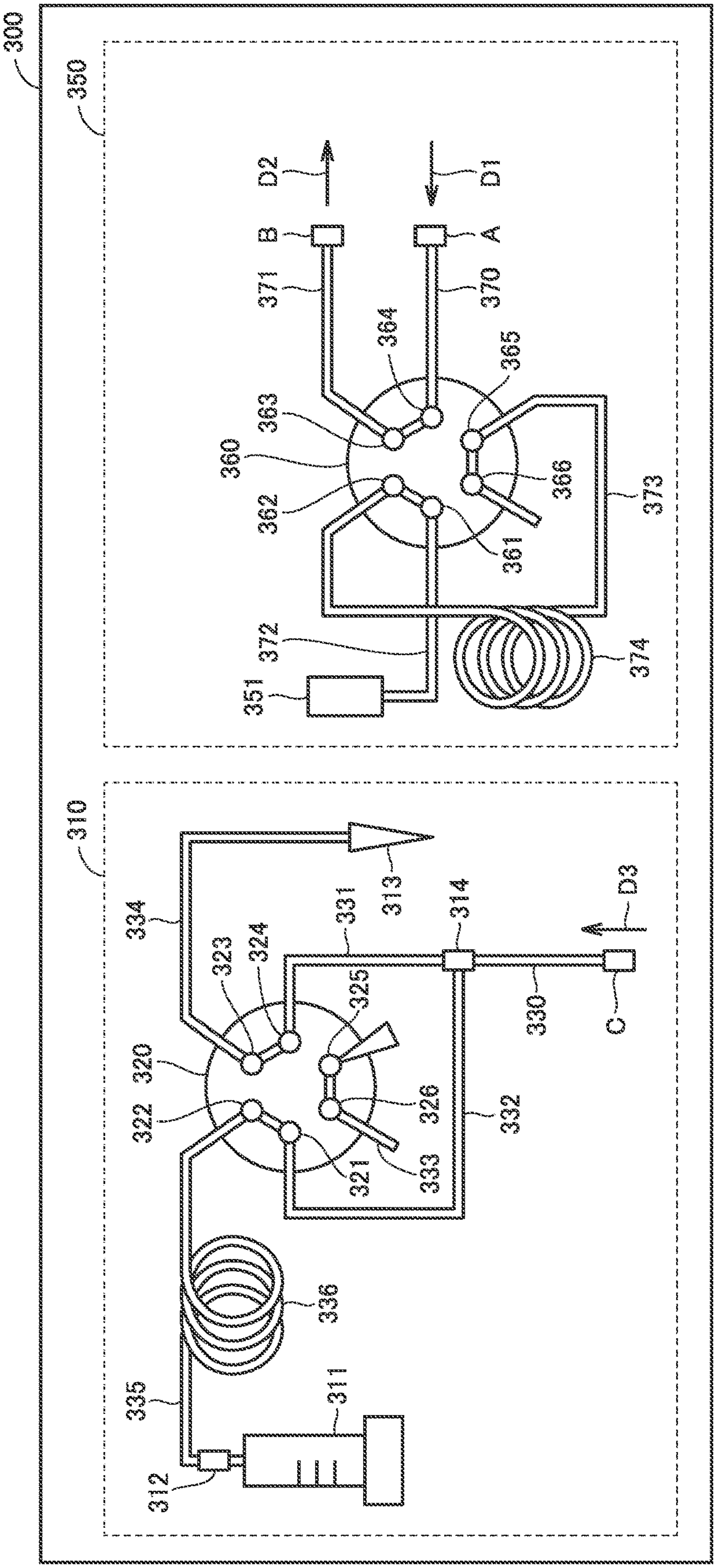
FIG. 2 shows a configuration of a sampler 300.

FIG. 2 shows a configuration of sampler 300. FIG. 2 shows sampler 300 while dividing it into a first unit 310 and a second unit 350. The configurations of the respective units will be described below.

(First Unit 310)

First unit 310 includes a syringe 311, a needle 313, a flow path switching valve 320, and a sample loop 336.

Flow path switching valve 320 includes six ports 321 to 326.

Syringe 311 is connected through a flow path 335 to port 322. On flow path 335, sample loop 336 is provided. Syringe 311 is configured to discharge or suction a liquid or gas to and from flow path 335. Sample loop 336 may store the sample suctioned through needle 313. In this sense, sample loop 336 is an example of the storage unit.

On flow path 335, a three-way valve 312 is provided. Syringe 311 is connected via three-way valve 312 to flow path 335 and containers that contain various liquids.

Figure 3:
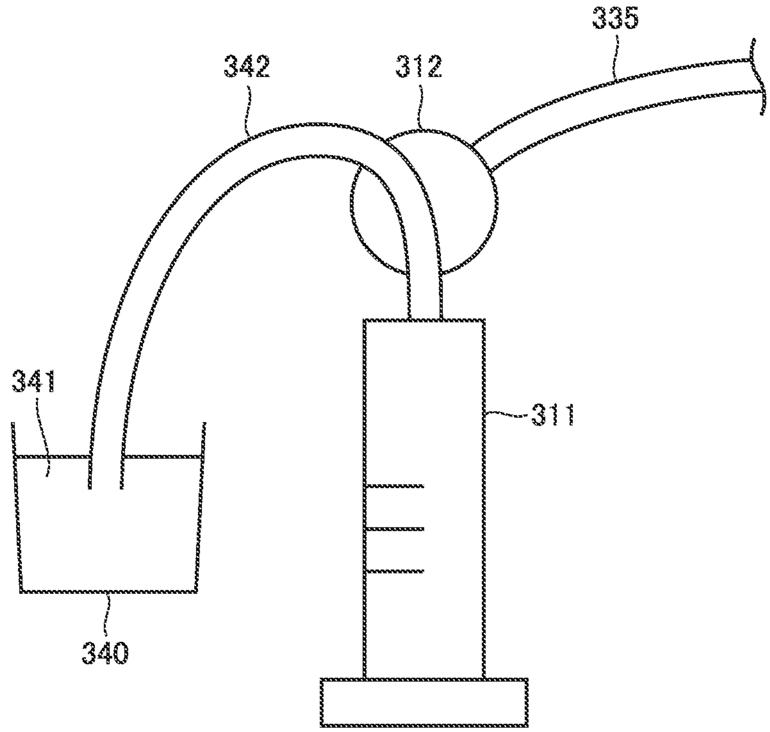
FIG. 3 shows a configuration of a three-way valve 312 and therearound.
Figure 4:
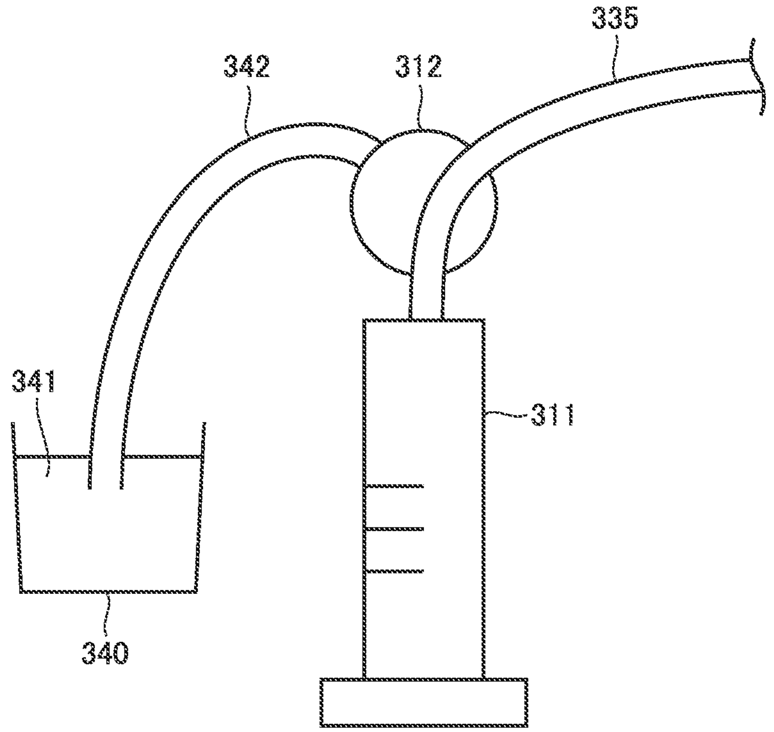
FIG. 4 shows a configuration of three-way valve 312 and therearound.

FIGS. 3 and 4 each show a configuration of three-way valve 312 and therearound. As described below with reference to FIGS. 3 and 4, three-way valve 312 can switch a target to be connected with syringe 311.

In the state shown in FIG. 3, three-way valve 312 connects syringe 311 through a flow path 342 to container 340. Container 340 contains a liquid 341. In the state shown in FIG. 3, syringe 311 can suction liquid 341 and store it in syringe 311.

In the state shown in FIG. 4, three-way valve 312 connects syringe 311 to flow path 335. In one example implementation, syringe 311 can discharge liquid 341 stored in syringe 311 toward flow path 335 in the state shown in FIG. 4.

Referring back to FIG. 2, needle 313 is connected through a flow path 334 to port 323. As described below with reference to FIGS. 5 to 8 and the like, needle 313 can be used in injection of a sample and fractionation of an eluate from detector 500.

In flow path switching valve 320, port 326 is connected through a flow path 333 to a drain. Port 325 is closed. Port 321 is connected to a flow path 332, and port 324 is connected to a flow path 331.

Flow path 331 and flow path 332 are coupled to flow path 330 by a three-way joint 314. Point C is located on flow path 330. In other words, in first unit 310, the eluate from detector 500 is supplied to flow path 331 and flow path 332 through flow path 330. An arrow D3 indicates a direction in which the eluate flows from detector 500 to flow path 330. Flow path 331 is an example of the first line. Flow path 332 is an example of the second line.

(Second Unit 350)

Second unit 350 includes an injection port 351, a flow path switching valve 360, and a sample loop 374.

Flow path switching valve 360 includes six ports 361 to 366. Injection port 351 is connected through a flow path 372 to port 361.

Port 362 is connected through a flow path 373 to port 365. Sample loop 374 is provided on flow path 373. Port 366 is connected to the drain.

Port 363 is connected to a flow path 371. Point B is located on flow path 371. Port 364 is connected to a flow path 370. Point A is located on flow path 370. In other words, second unit 350 is supplied with the mobile phase from liquid delivery pump 200 through flow path 370 and supplies the liquid to separation column 400 through flow path 371.

[Sampling Operation]

Figure 5:
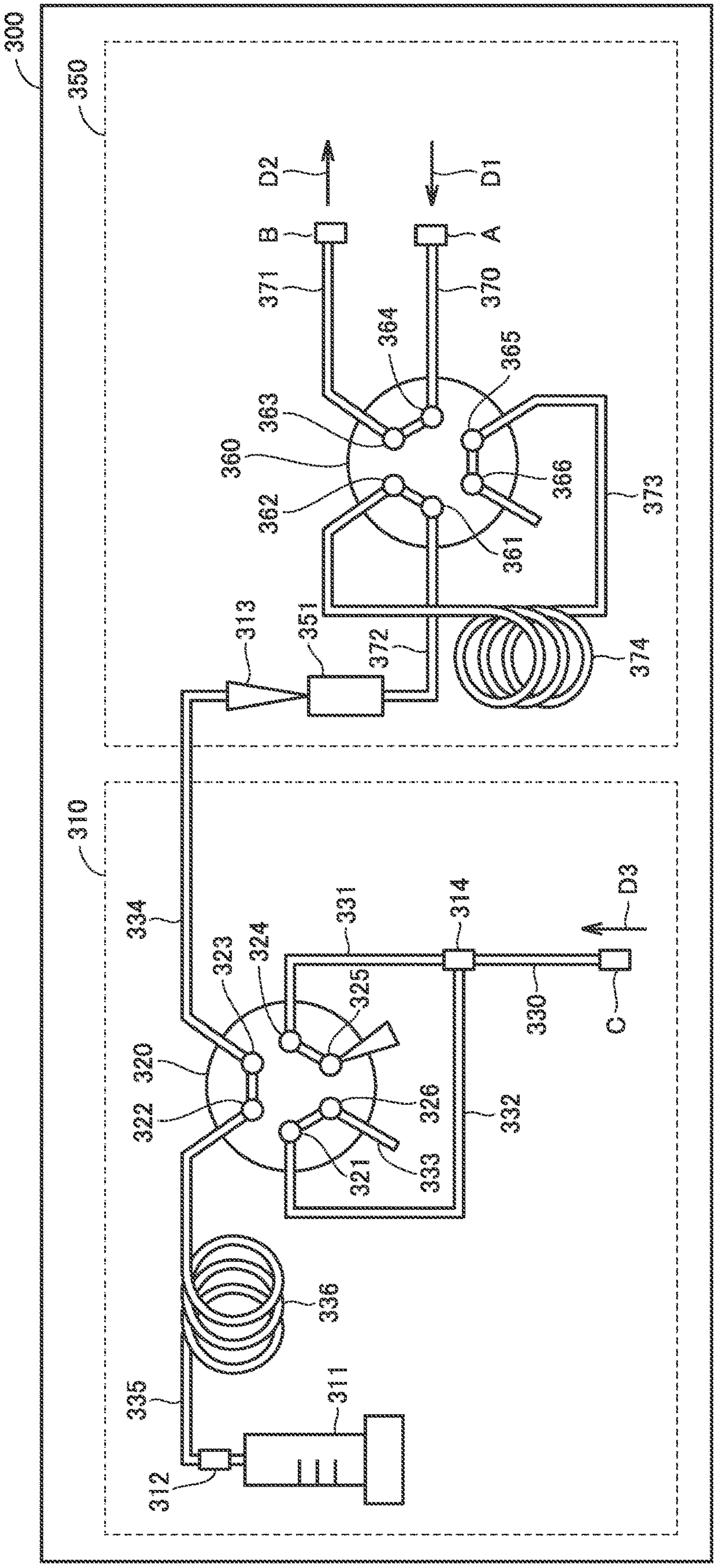
FIG. 5 shows a state of sampler 300 for a sampling operation.

FIG. 5 shows a state of sampler 300 for the sampling operation.

In the first state, flow path switching valve 320 of first unit 310 connects port 321 to port 322, connects port 323 to port 324, and connects port 325 to port 326. Herein, the state of sampler 300 when first unit 310 is controlled to the state shown in FIG. 5 is also referred to as "first state". The state shown in FIG. 5 is also referred to as "first state" of flow path switching valve 320 or first unit 310.

In the first state, flow path switching valve 360 of second unit 350 connects port 361 to port 362, connects port 363 to port 364, and connects port 365 to port 366.

In sampling, when the first unit is in the first state, needle 313 is moved into a container (not shown) that contains the sample. Syringe 311 suctions the sample through needle 313. The suctioned sample is stored in sample loop 336.

Subsequently, needle 313 is moved to be connected to injection port 351 as shown in FIG. 5. Syringe 311 discharges the sample in sample loop 336 to injection port 351 through needle 313. Consequently, the sample is stored in sample loop 374 of second unit 350.

Subsequently, the state of connection of the ports in flow path switching valve 360 of second unit 350 is changed. After the change, port 361 is connected to port 366, port 363 is connected to port 362, and port 365 is connected to port 364. In this state of connection, the mobile phase from point A flows successively through flow path 370, port 364, port 365, flow path 373, port 362, port 363, and flow path 371 to point B. The mobile phase then flows from point B to separation column 400. Along this flow, the sample stored in sample loop 374 also flows to separation column 400.

In the sampling operation, flow path switching valve 320 is controlled to the first state. As shown in FIG. 5, in the first state, detector 500 is connected through flow paths 330, 332 to the drain. Consequently, the eluate from detector 500 is introduced into the drain. This reliably avoids inadvertent introduction of the eluate from detector 500 into separation column 400 as a sample.

[Fractionating Operation]

Figure 6:
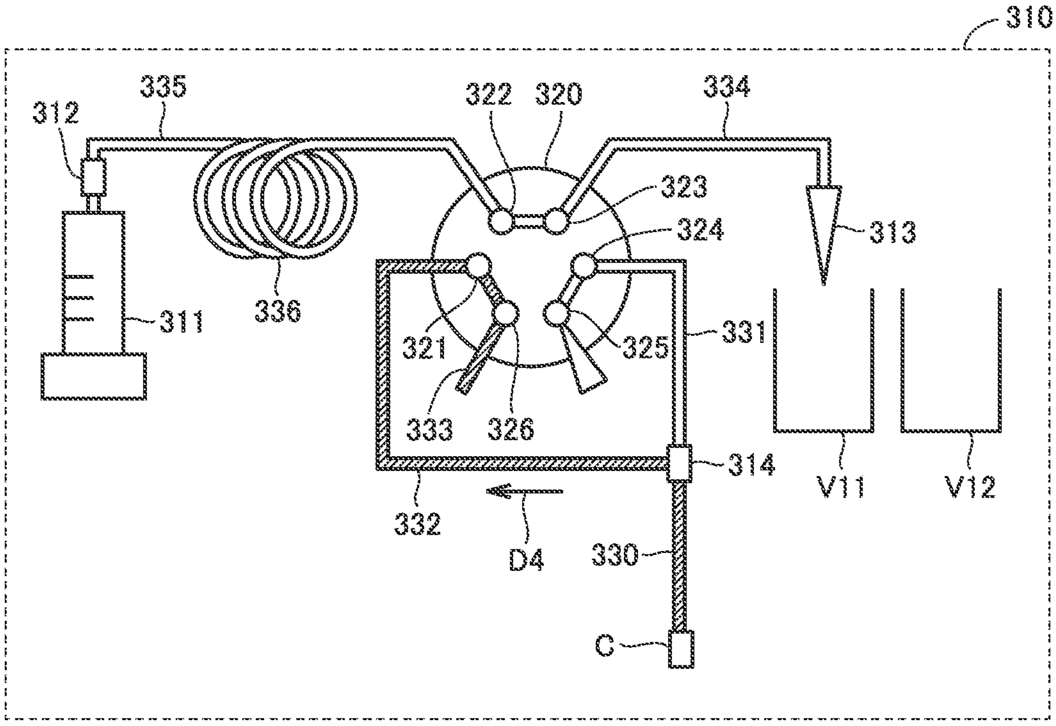
FIG. 6 shows a state of a first unit 310 of sampler 300 for a fractionating operation.
Figure 7:
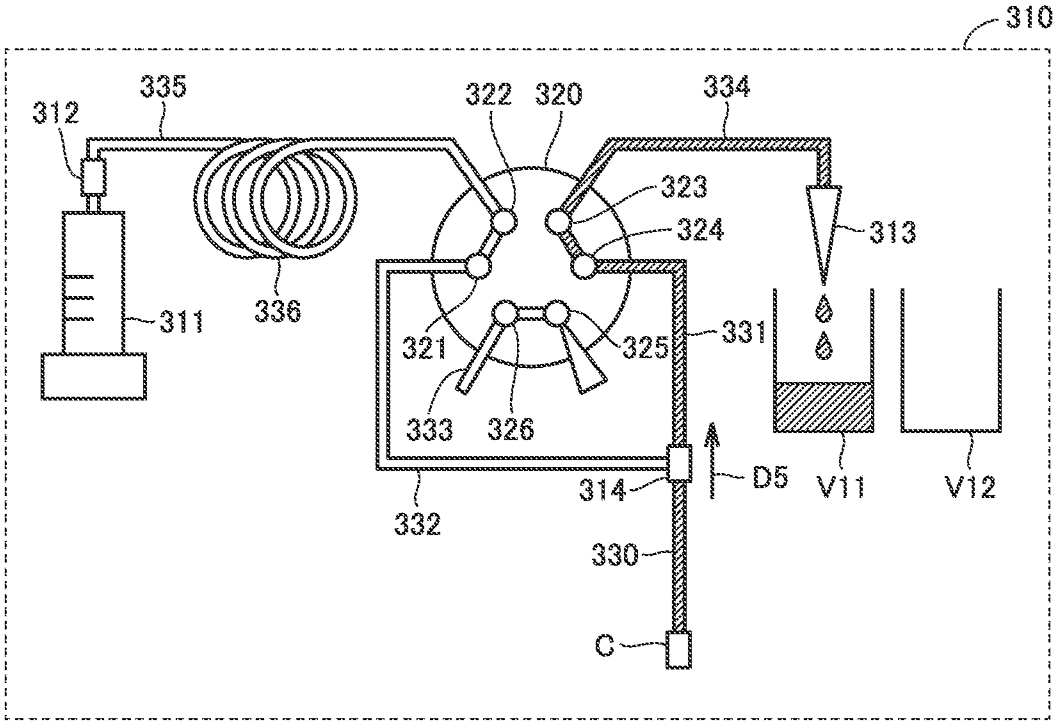
FIG. 7 shows a state of first unit 310 of sampler 300 for the fractionating operation.
Figure 8:
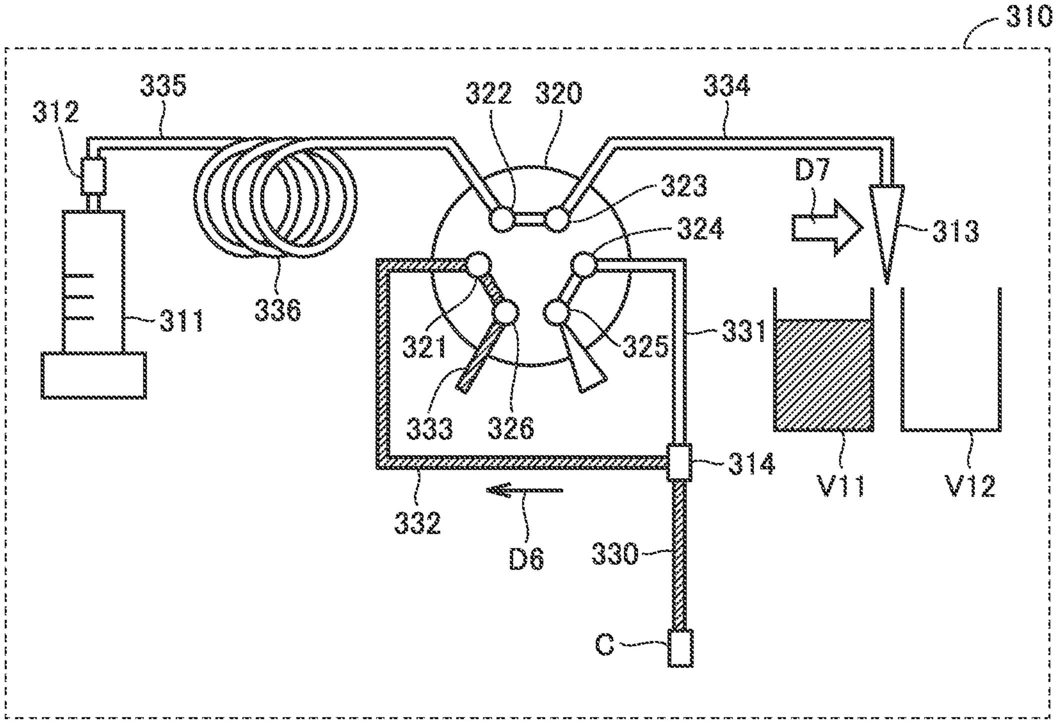
FIG. 8 shows a state of first unit 310 of sampler 300 for the fractionating operation.

FIGS. 6 to 8 each show a state of first unit 310 of sampler 300 for the fractionating operation. Each of FIGS. 6 to 8 shows two containers V11, V12 for fractionating the eluate from detector 500. Each of containers V11, V12 is an example of the fractionation container.

In fractionation of the eluate from detector 500, first unit 310 is first controlled to a standby state as shown in FIG. 6. In the standby state (FIG. 6), flow path switching valve 320 is controlled to the same state (first state) as the state shown in FIG. 5. Consequently, the eluate from detector 500 is delivered through flow path 330, three-way joint 314, flow path 332, port 321, port 326, and flow path 333 to the drain, as indicated by an arrow D4. In FIG. 6, the eluate in flow paths 330, 332, 333 is hatched.

Subsequently, flow path switching valve 320 is controlled to assume the state shown in FIG. 7. The state of sampler 300 when flow path switching valve 320 is controlled to the state shown in FIG. 7 is also referred to as "second state" herein. The state shown in FIG. 7 is also referred to as "second state" of flow path switching valve 320 or first unit 310.

In the state shown in FIG. 7, port 321 is connected to port 322, port 323 is connected to port 324, and port 325 is connected to port 326. Consequently, the eluate from detector 500 is delivered through flow path 330, three-way joint 314, flow path 331, port 324, port 323, and flow path 334 to needle 313 as indicated by an arrow D5. In FIG. 7, the eluate in flow paths 330, 331, 334 is hatched. In the state shown in FIG. 7, needle 313 is located above container V11. The eluate from detector 500 is thus supplied to container V11.

In the state shown in FIG. 7, the space including flow path 332, flow path 335, and syringe 311 is hermetically sealed. The eluate from detector 500 thus does not flow into flow path 332.

In fractionation, when the container supplied with the eluate is switched, flow path switching valve 320 is temporarily controlled to the state shown in FIG. 8. The state of flow path switching valve 320 shown in FIG. 8 is the same as the state shown in FIG. 6.

In the state shown in FIG. 8, while needle 313 is moving from above container V11 to above container V12 as indicated by an arrow D7, the eluate from detector 500 is delivered through flow path 330, three-way joint 314, flow path 332, port 321, port 326, and flow path 333 to the drain as indicated by an arrow D6. In FIG. 8, the eluate in flow paths 330, 332, 333 is hatched.

Subsequently, the state of flow path switching valve 320 is returned to the state shown in FIG. 7. Consequently, the eluate from detector 500 is supplied to container V12 through needle 313.

[Cleaning Operation]

Figure 9:
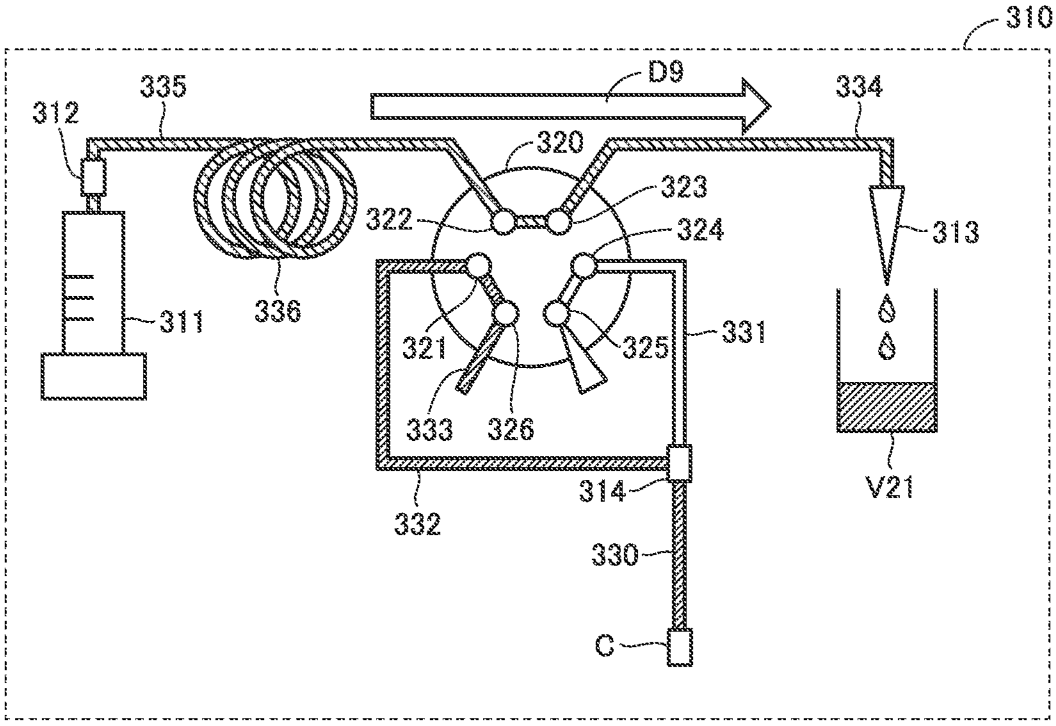
FIG. 9 is a diagram for illustrating a cleaning operation of a needle 313.

FIG. 9 is a diagram for illustrating a cleaning operation of needle 313. In the state shown in FIG. 9, flow path switching valve 320 is controlled to the state (first state) shown in FIG. 5.

In this state, the state of three-way valve 312 is first controlled to the state shown in FIG. 3. A cleaning liquid (which may be a mobile phase) is used as liquid 341 in container 340. Syringe 311 suctions liquid 341. Consequently, liquid 341 is stored in syringe 311.

Subsequently, the state of three-way valve 312 is controlled to the state shown in FIG. 4. Syringe 311 discharges liquid 341 toward sample loop 336 and needle 313. As a result, liquid 341 is discharged to a container V21 through sample loop 336 and needle 313 as indicated by an arrow D9 in FIG. 9. Consequently, flow path 335, sample loop 336, and flow path 334 are cleaned with liquid 341. In FIG. 9, the cleaning liquid flowing through flow path 335, sample loop 336, and flow path 334 is hatched.

[Makeup Operation]

Figure 10:
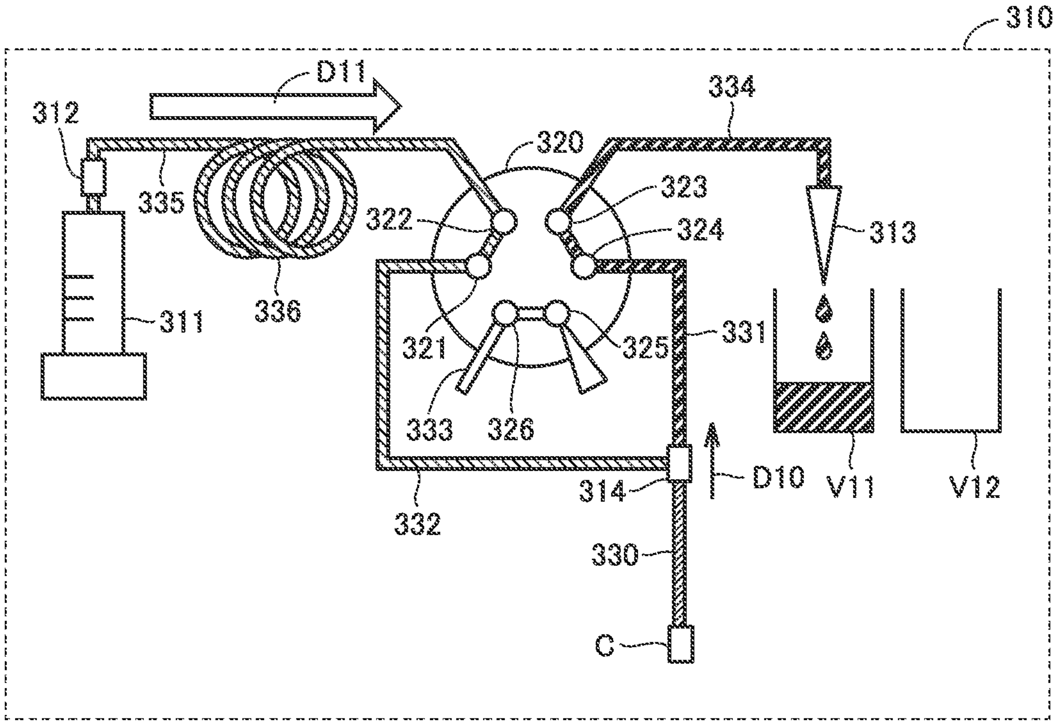
FIG. 10 shows a makeup operation in sampler 300.

FIG. 10 illustrates a makeup operation in sampler 300. The makeup operation in the present embodiment includes mixing the eluate from detector 500 with a solvent to fractionate the eluate, downstream of detector 500. A makeup solvent may be a liquid used as the mobile phase.

The makeup solvent is stored in sample loop 336. More specifically, in the state shown in FIG. 3, syringe 311 suctions liquid 341. The makeup solvent is used as liquid 341. Subsequently, in the state shown in FIG. 4, syringe 311 discharges liquid 341 to sample loop 336. Consequently, the makeup solvent is stored in sample loop 336 as liquid 341.

As shown in FIG. 10, in the makeup operation, the state of flow path switching valve 320 is controlled to the state (second state) shown in FIG. 7. In this state, syringe 311 delivers the makeup solvent stored in sample loop 336 to three-way joint 314, as indicated by an arrow D11. As a result, the eluate from detector 500 is mixed with the makeup solvent in three-way joint 314. The eluate mixed with the makeup solvent is then delivered to needle 313 as indicated by an arrow D10. In FIG. 10, the eluate in flow path 330, the makeup solvent in flow path 332, and the mixed solution in flow path 334 are hatched differently.

[Fractionating Operation (Variation)]

Figure 11:
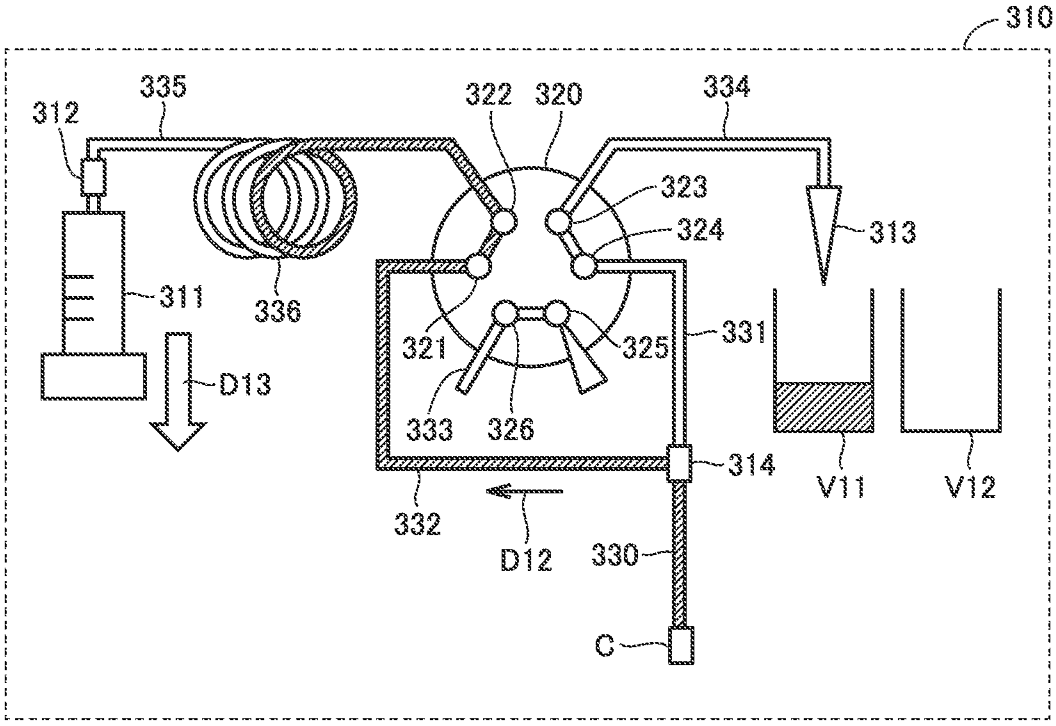
FIG. 11 is a diagram for illustrating a variation of the fractionating operation.
Figure 12:
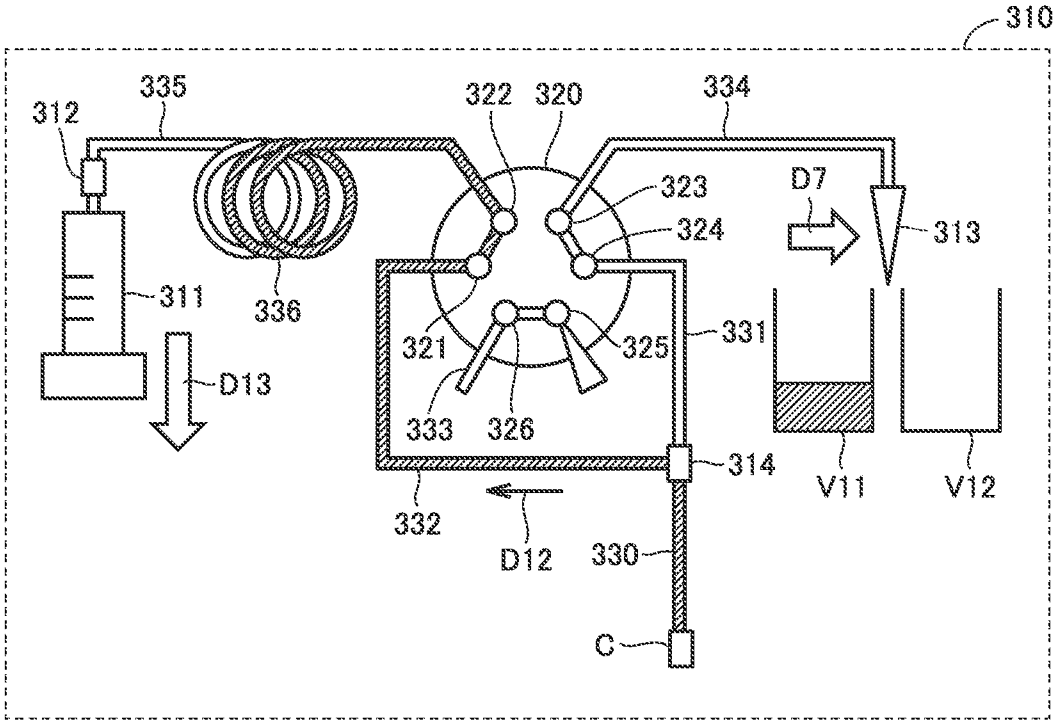
FIG. 12 is a diagram for illustrating the variation of the fractionating operation.
Figure 13:
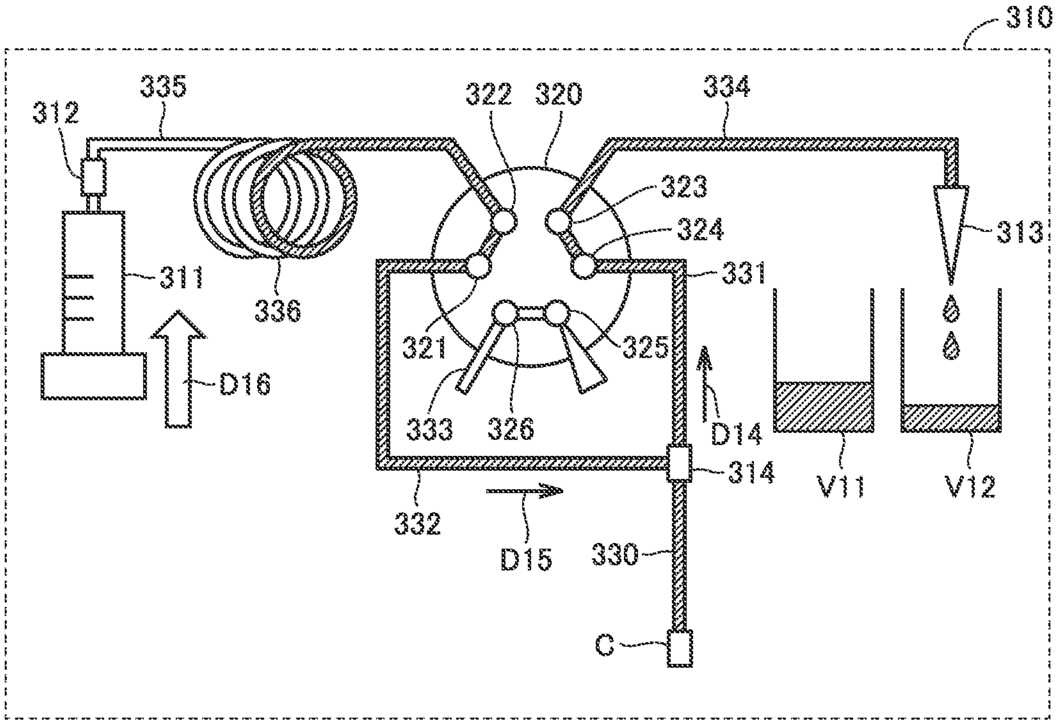
FIG. 13 is a diagram for illustrating the variation of the fractionating operation.

FIGS. 11 to 13 are diagrams for illustrating a variation of the fractionating operation. The variation of the fractionating operation will be described below with reference to FIGS. 6 and 7 and FIGS. 11 to 13.

In fractionation, after the standby state shown in FIG. 6, the eluate from detector 500 is supplied to container V11 in sampler 300, as shown in FIG. 7.

In this variation, when the container supplied with the eluate is switched, sampler 300 is controlled to the state shown in FIG. 11, not to the state shown in FIG. 8.

In the state shown in FIG. 11, the state of flow path switching valve 320 is not changed from the state shown in FIG. 7. In the state shown in FIG. 11, syringe 311 suctions the air in flow path 335, as indicated by an arrow D13. Flow path 335 is connected via port 322 and port 321 to flow path 332. Consequently, the eluate from detector 500 flows into flow path 332, as indicated by an arrow D12. This restrains the eluate from detector 500 from flowing toward needle 313 through flow path 331 or the like. In FIG. 11, the eluate flowing from flow path 330 into flow paths 332, 335 is hatched.

Subsequently, needle 313 is moved from above container V11 to above container V12 as indicated by arrow D7 in FIG. 12.

When the movement of needle 313 is complete, syringe 311 discharges the air toward sample loop 336, as indicated by an arrow D16 in FIG. 13. Consequently, the eluate introduced into flow path 332 is delivered to three-way joint 314 as indicated by an arrow D15, and then, is delivered toward needle 313 as indicated by an arrow D14. In FIG. 11, the eluate in flow paths 330, 332, 335, 331, 334 is hatched.

In the variation of the fractionating operation described with reference to FIGS. 6 and 7 and FIGS. 11 to 13, while the container supplied with the eluate from detector 500 is switched, the eluate is stored in flow path 332. This avoids a situation in which the eluate delivered from detector 500 during that period is delivered to the drain to be discarded.

[Block Configuration of Sampler 300]

Figure 14:
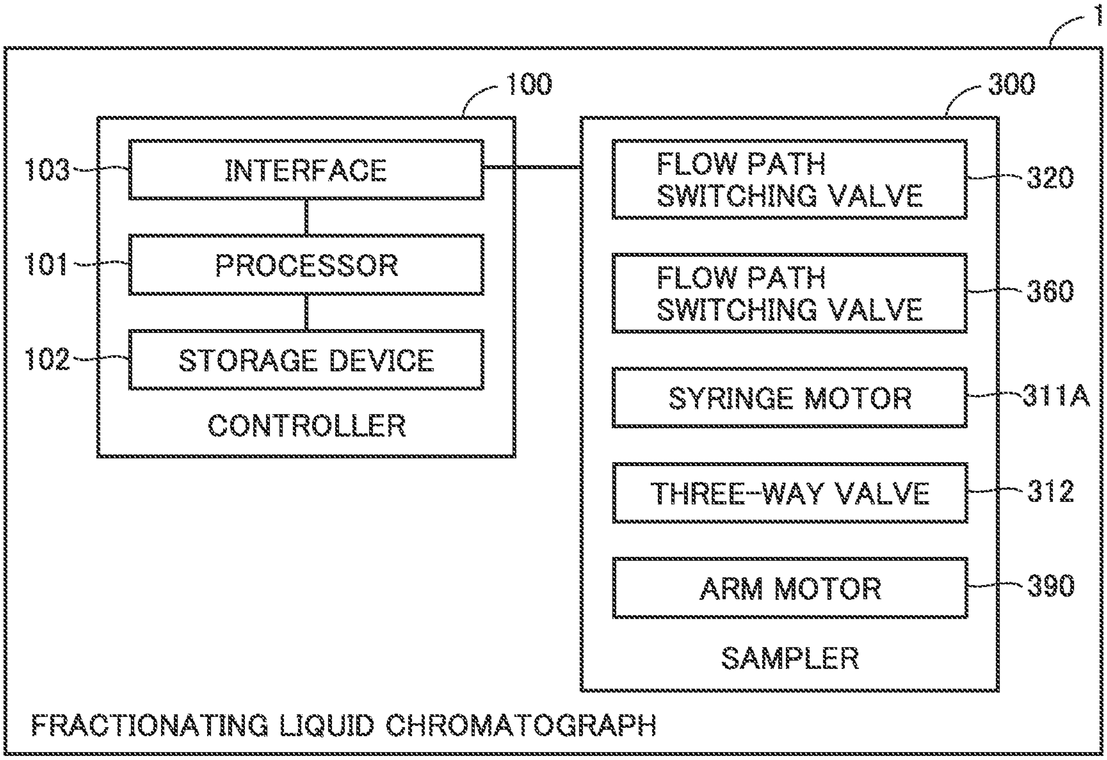
FIG. 14 shows a block configuration of sampler 300.

FIG. 14 shows a block configuration of sampler 300. As shown in FIG. 14, sampler 300 further includes a syringe motor 311A and an arm motor 390, in addition to flow path switching valve 320, flow path switching valve 360, and three-way valve 312.

FIG. 14 also shows a block configuration of controller 100. Flow path switching valve 320, flow path switching valve 360, three-way valve 312, syringe motor 311A, and arm motor 390 are connected to interface 103 of controller 100. Consequently, controller 100 controls the operations of the respective elements in sampler 300 via interface 103.

More specifically, controller 100 switches the state of connection of ports 321 to 326 in flow path switching valve 320 between the first state and the second state. Controller 100 switches the state of connection of ports 361 to 363 in flow path switching valve 360. Controller 100 switches the state of three-way valve 312 between the state shown in FIG. 3 and the state shown in FIG. 4.

Syringe motor 311A is driven for suctioning and discharging the air or liquid from and to syringe 311. Controller 100 controls driving of syringe motor 311A to control suctioning and discharging by syringe 311.

Arm motor 390 is driven for moving needle 313. Controller 100 controls driving of arm motor 390, thereby controlling the position of needle 313.

[Process Flow]

Figure 15:
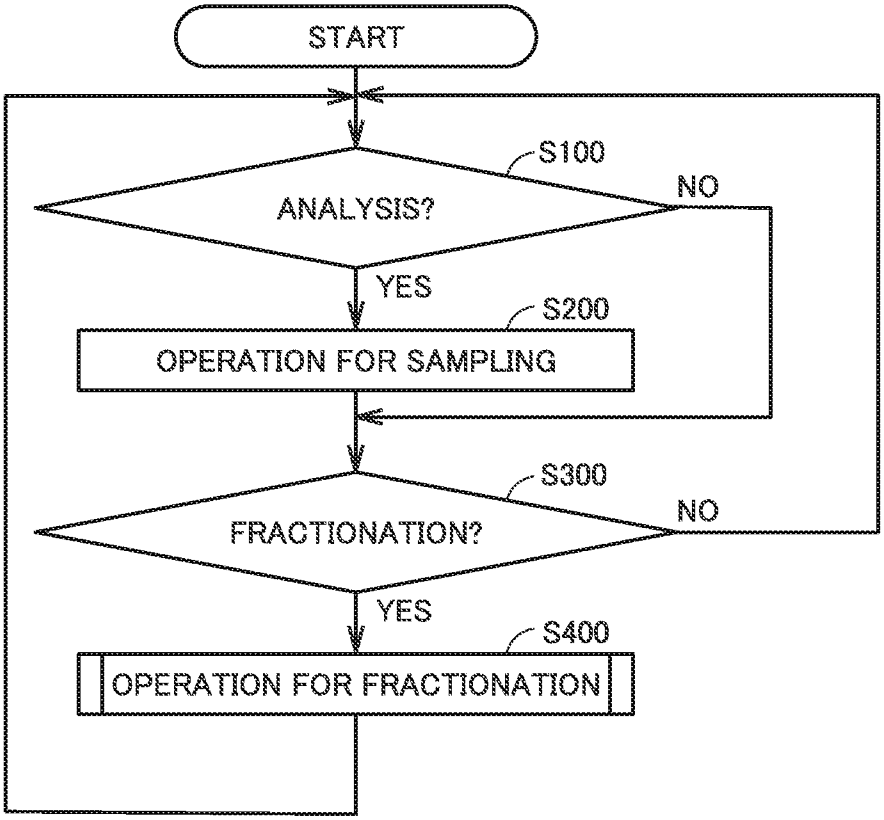
FIG. 15 is a flowchart of a process for controlling sampler 300 by fractionating liquid chromatograph 1 to analyze a sample and fractionate an eluate from detector 500.

FIG. 15 is a flowchart of a process for controlling sampler 300 by fractionating liquid chromatograph 1 to analyze the sample and fractionate the eluate from detector 500. In one example implementation, in fractionating liquid chromatograph 1, the process of FIG. 15 is performed as processor 101 executes a given program.

Referring to FIG. 15, in step S100, fractionating liquid chromatograph 1 determines whether the timing for analyzing the sample has arrived. In one example implementation, when an operator inputs an instruction to start analysis to an input device, fractionating liquid chromatograph 1 obtains this instruction via interface 103. In response to the acquisition of this instruction, fractionating liquid chromatograph 1 then determines that the timing for analysis has arrived.

Fractionating liquid chromatograph 1 moves the control to step S200 when determining that the timing for analysis has arrived (YES in step S100), and otherwise (NO in step S100), moves the control to step S300.

In step S200, fractionating liquid chromatograph 1 causes sampler 300 to perform the operation for sampling as described with reference to FIG. 5. The control then proceeds to step S300.

In step S300, fractionating liquid chromatograph 1 determines whether the timing for fractionating the eluate from detector 500 has arrived. In one example implementation, when the operator inputs an instruction to start fractionation to the input device, fractionating liquid chromatograph 1 obtains this instruction via interface 103. In response to the acquisition of this instruction, fractionating liquid chromatograph 1 then determines that the timing for fractionation has arrived.

Fractionating liquid chromatograph 1 moves the control to step S400 when determining that the timing for fractionation has arrived (YES in step S300), and otherwise (NO in step S300), returns the control to step S100.

In step S400, fractionating liquid chromatograph 1 causes sampler 300 to perform the operation for fractionating the eluate. Subsequently, fractionating liquid chromatograph 1 returns the control to step S100.

Figure 16:
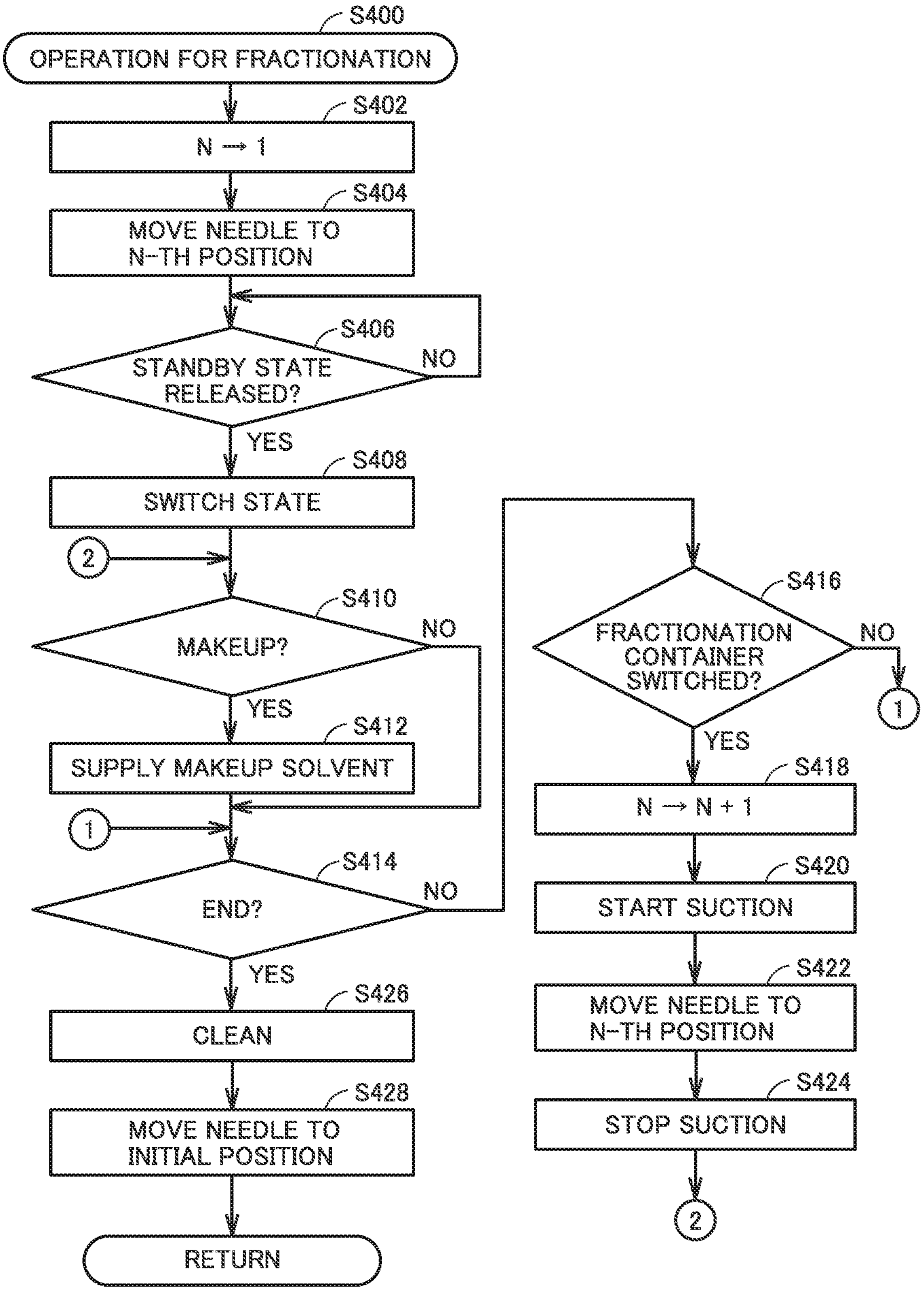
FIG. 16 is a flowchart of a subroutine of a process for causing sampler 300 to perform an operation for fractionation in step S400.

FIG. 16 is a flowchart of a subroutine of a process for causing sampler 300 to perform the operation for fractionation in step S400.

Referring to FIG. 16, in step S402, fractionating liquid chromatograph 1 sets the value of a variable N, which is used in the process of FIG. 16, to one, which is an initial value. The value of variable N is referred to in steps S404, 422, which will be described below, and is updated in step S418, which will be described below.

In step S404, fractionating liquid chromatograph 1 moves needle 313 to an N-th position. In fractionating liquid chromatograph 1, N number of fractionation containers are set. "N-th position" is a position for needle 313 to provide the eluate from detector 500 to the container set as the N-th fractionation container.

In step S406, fractionating liquid chromatograph 1 determines whether the timing for releasing the standby state (FIG. 6) has arrived.

In one example implementation, the operator inputs an instruction to release the standby state to the input device at the timing at which the operator determines that the eluate from detector 500 may be stored in the fractionation container. Fractionating liquid chromatograph 1 obtains this instruction via interface 103. In response to the acquisition of this instruction, fractionating liquid chromatograph 1 then determines that the timing for releasing the standby state has arrived.

In another example implementation, fractionating liquid chromatograph 1 may determine that the timing for releasing the standby state has arrived when an analysis result of the sample supplied from separation column 400, which has been obtained in detector 500, satisfies given conditions (e.g., when an absorbance of a wavelength in a given range exceeds a given threshold).

Fractionating liquid chromatograph 1 repeats the control of step S406 until determining that the timing for releasing the standby state has arrived (NO in step S406), and moves the control to step S408 when determining that the timing for releasing the standby state has arrived (YES in step S406).

In step S408, fractionating liquid chromatograph 1 switches the state of sampler 300 from the first state to the second state (FIG. 7 or the like). Consequently, the eluate from detector 500 is supplied to the N-th fractionation container.

In step S410, fractionating liquid chromatograph 1 determines whether it has obtained an instruction to perform makeup.

In one example implementation, the operator inputs the instruction to perform makeup to the input device when determining that the eluate from detector 500 is to be mixed with the makeup solvent and stored in the fractionation container. Fractionating liquid chromatograph 1 obtains this instruction as the instruction to perform makeup via interface 103.

When determining that it has obtained the instruction to perform makeup (YES in step S410), fractionating liquid chromatograph 1 moves the control to step S412. When determining that it has not obtained the instruction to perform makeup (NO in step S410), fractionating liquid chromatograph 1 moves the control to step S414.

In step S412, fractionating liquid chromatograph 1 causes syringe 311 to supply the makeup solvent, as described with reference to FIG. 10. Thus, the eluate from detector 500 is mixed with the makeup solvent and is supplied to the N-th fractionation container.

In step S414, fractionating liquid chromatograph 1 determines whether it has obtained an instruction to end the fractionation of the eluate from detector 500.

In one example implementation, the operator inputs the instruction to end the fractionation to the input device when determining that the timing for ending the fractionation of the eluate from detector 500 has arrived. Fractionating liquid chromatograph 1 obtains this instruction via interface 103.

When determining that it has obtained the instruction to end the fractionation of the eluate from detector 500 (YES in step S414), fractionating liquid chromatograph 1 moves the control to step S426. When determining that it has not obtained the instruction to end the fractionation of the eluate from detector 500 (NO in step S414), fractionating liquid chromatograph 1 moves the control to step S416.

In step S416, fractionating liquid chromatograph 1 determines whether the timing for switching the fractionation container has arrived.

In one example implementation, when determining that the timing for switching the fractionation container supplied with the eluate has arrived, the operator inputs an instruction for switching. When obtaining this instruction via interface 103, fractionating liquid chromatograph 1 determines that the timing for switching the fractionation container has arrived.

In another example implementation, fractionating liquid chromatograph 1 may determine that the timing for switching the fractionation container has arrived, in response to supply of a certain amount of eluate to a fractionation container. The amount of the eluate supplied to the fractionation container may be derived using a time elapsed from start of supply of the eluate to the fractionation container.

In still another example implementation, fractionating liquid chromatograph 1 may determine that the timing for switching the fractionation container has arrived based on a sample detection result obtained in detector 500. For example, fractionating liquid chromatograph 1 may determine that the timing for switching the fractionation container has arrived in response to a change in a peak wavelength of an absorbance of the sample, which has been detected in detector 500, by a given value or more, in a situation where detector 500 is supplied with the sample from separation column 400 continuously in time. Consequently, different components separated in separation column 400 can be stored in different fractionation containers.

When determining that the timing for switching the fractionation container has arrived (YES in step S416), fractionating liquid chromatograph 1 moves the control to step S418. When determining that the timing for switching the fractionation container has not arrived (NO in step S416), fractionating liquid chromatograph 1 returns the control to step S414.

In step S418, fractionating liquid chromatograph 1 updates the value of variable N by addition of one.

In step S420, fractionating liquid chromatograph 1 causes syringe 311 to start suctioning the air in flow path 335, as described with reference to FIG. 11.

In step S422, fractionating liquid chromatograph 1 moves needle 313 to the N-th position (the position for supplying the eluate to the N-th fractionation container), as described with reference to FIG. 12.

In step S424, fractionating liquid chromatograph 1 causes syringe 311 to stop the suction started in step S420. Consequently, the eluate from detector 500 starts to be provided to the N-th (the value of N is updated in step S418) fractionation container. Subsequently, fractionating liquid chromatograph 1 returns the control to step S410.

In step S426, fractionating liquid chromatograph 1 cleans needle 313, as described with reference to FIG. 9.

In step S428, fractionating liquid chromatograph 1 returns the position of needle 313 to the initial position. Fractionating liquid chromatograph 1 then returns the control to FIG. 15.

With the process described with reference to FIGS. 15 and 16, sampler 300 functions as a sampler in sample analysis in step S200 and functions as a fractionating device in step S400.

More specifically, sampler 300 is controlled to the first state (FIG. 5 or the like) in step S200. Needle 313 is then connected to sample loop 336 for storing the sample, and is used in sampling. In other words, sampler 300 functions as a sampler.

In step S400, sampler 300 is controlled to the second state (FIG. 7 or the like). Needle 313 is then used to fractionate the eluate from detector 500. In other words, the sampler functions as a fractionating device.

Since sampler 300 functions not only as the sampler but also as the fractioning device, fractionating liquid chromatograph 1 does not need to further include a fractionating device as long as it includes sampler 300. Thus, the component parts of fractionating liquid chromatograph 1 can be reduced.

In fractionating liquid chromatograph 1, both of the sample and the eluate from detector 500 are held in sampler 300. Even when both of the sample and the eluate need to be cooled, thus, it suffices that a cooling device is provided only in sampler 300. In other words, no fractionating device is required, and accordingly, a cooling device conventionally provided in the fractionating device is not required as well. Thus, the component parts of fractionating liquid chromatograph 1 can be reduced further.

In fractionating liquid chromatograph 1, the eluate from detector 500 is introduced into sampler 300. When the eluate from detector 500 is used as the sample in new analysis, thus, the eluate does not need to be moved from outside of sampler 300 to sampler 300. This reduces a burden on the operator.

Aspects

It will be appreciated by a person skilled in the art that the illustrative embodiments described above provide specific examples of the following aspects.

(Clause 1) A fractionating liquid chromatograph according to an aspect may include a liquid delivery pump, a sampler connected to the liquid delivery pump, a separation column connected to the sampler, and a detector connected to the separation column and the sampler. The sampler may include a needle that suctions or discharges a sample, a flow path switching valve connected to the needle, and a storage unit to store a sample. The fractionating liquid chromatograph may further include a controller that controls the flow path switching valve to switch a state of the flow path switching valve between a first state and a second state, the needle being connected to the storage unit via the flow path switching valve in the first state, the needle being connected to the detector via the flow path switching valve in the second state.

With the fractionating liquid chromatograph according to clause 1, the sampler can also be used as a fractionating device. The component parts of the fractionating liquid chromatograph can thus be reduced.

(Clause 2) In the fractionating liquid chromatograph according to clause 1, the detector may be connected to a drain in the first state.

The fractionating liquid chromatograph according to clause 2 reliably avoids inadvertent introduction of the eluate from the detector into the separation column as the sample in the first state.

(Clause 3) The fractionating liquid chromatograph according to clause 2 may further include a first line and a second line connected to the detector, and a syringe connected to the needle via the storage unit in the first state. The syringe may cause the needle to discharge the sample stored in the storage unit toward the separation column. In the first state, the first line may be closed, and the detector may be connected to the drain through the second line. In the second state, the detector may be connected through the first line to the needle, and the second line may be connected to the syringe.

With the fractionating liquid chromatograph according to clause 3, in the first state, the eluate from the detector is introduced into the drain from the second line and does not leak out of the first line. This reliably avoids inadvertent introduction of the eluate from the detector into the separation column as the sample in the first state. In the second state, the eluate from the detector is introduced into the fractionation container through the first line and the needle. This restrains the eluate from leaking out of the syringe through the second line in the second state.

(Clause 4) In the fractionating liquid chromatograph according to clause 3, in the first state, the syringe may cause the needle to suction a makeup solvent and cause the storage unit to store the makeup solvent, and in the second state, the syringe may mix the makeup solvent stored in the storage unit with an eluate from the detector through the second line.

With the fractionating liquid chromatograph according to clause 4, in the second state, the eluate from the detector is introduced into the fractionation container through the needle while being mixed with the makeup solution. This improves a rate of collecting components contained in the eluate from the detector.

(Clause 5) In the fractionating liquid chromatograph according to clause 3, in the second state, the controller may cause the needle to move from a first fractionation container to a second fractionation container, and may cause the syringe to suction the second line during moving of the needle.

With the fractionating liquid chromatograph according to clause 5, in the second state, during moving of the needle, the second line is suctioned, so that the eluate from the detector is introduced into the second line. This restricts the eluate from the detector from leaking out of the needle during moving of the needle, thus reducing a loss of the eluate.

(Clause 6) In the fractionating liquid chromatograph according to any one of clauses 1 to 5, in the first state, the controller may cause the syringe to discharge a cleaning liquid toward the storage unit and the needle.

With the fractionating liquid chromatograph according to clause 6, the storage unit and the needle can be cleaned in the first state.

(Clause 7) In a control method for a fractionating liquid chromatograph according to an aspect, the fractionating liquid chromatograph may include a liquid delivery pump, a sampler connected to the liquid delivery pump, a separation column connected to the sampler, and a detector connected to the separation column and the sampler. The sampler may include a needle that suctions or discharges a sample, a flow path switching valve connected to the needle, and a storage unit to store a sample. The control method may include: setting a state of the flow path switching valve to a first state to deliver the sample to the separation column, the needle being connected to the storage unit for storing the sample via the flow path switching valve in the first state; and setting the state of the flow path switching valve to a second state to fractionate an eluate from the detector, the needle being connected to the detector via the flow path switching valve in the second state.

With the control method according to clause 7, the sampler can also be used as a fractionating device. The component parts of the fractionating liquid chromatograph can thus be reduced.

It should be appreciated that the embodiments disclosed herein are illustrative in every sense and are not limitative. The scope of the present disclosure is defined by the terms of the claims, rather than the embodiments described above, and is intended to include any modifications within the scope and meaning equivalent to the terms of the claims.

REFERENCE SIGNS LIST

1 fractionating liquid chromatograph; 100 controller; 200 liquid delivery pump; 300 sampler; 400 separation column; 500 detector.

The invention claimed is:

1. A fractionating liquid chromatograph comprising:
a liquid delivery pump;
a sampler connected to the liquid delivery pump, the sampler including
 a needle that suctions or discharges a sample,
 a flow path switching valve connected to the needle, and
 a storage unit to store a sample;
a separation column connected to the sampler;
a detector connected to the separation column and the sampler;
a controller that controls the flow path switching valve to switch a state of the flow path switching valve between a first state and a second state, the needle being connected to the storage unit via the flow path switching valve in the first state, the needle being connected to the detector via the flow path switching valve in the second state;
a first line and a second line connected to the detector; and
a syringe connected to the needle via the storage unit in the first state,
wherein:
the syringe causes the needle to discharge the sample stored in the storage unit toward the separation column,
in the first state,
 the first line is closed, and
 the detector is connected through the second line to a drain, and
in the second state,
 the detector is connected through the first line to the needle, and
 the second line is connected to the syringe.

2. The fractionating liquid chromatograph according to claim 1, wherein
in the first state, the syringe causes the needle to suction a makeup solvent and causes the storage unit to store the makeup solvent, and in the second state, the syringe mixes the makeup solvent stored in the storage unit with an eluate from the detector through the second line.

3. The fractionating liquid chromatograph according to claim 1, wherein in the second state, the controller causes the needle to move from a first fractionation container to a second fractionation container, and the controller causes the syringe to suction the second line during moving of the needle.

4. The fractionating liquid chromatograph according to claim 1, wherein in the first state, the controller causes the syringe to discharge a cleaning liquid toward the storage unit and the needle.

5. A control method for a fractionating liquid chromatograph, the fractionating liquid chromatograph including a liquid delivery pump, a sampler connected to the liquid delivery pump, the sampler including a needle that suctions or discharges a sample, a flow path switching valve connected to the needle, and a storage unit to store a sample, a separation column connected to the sampler, a detector connected to the separation column and the sampler, a first line and a second line connected to the detector, and a syringe connected to the needle via the storage unit in the first state, the control method comprising:

setting a state of the flow path switching valve to a first state to deliver the sample to the separation column, the needle being connected to the storage unit via the flow path switching valve in the first state; and setting the state of the flow path switching valve to a second state to fractionate an eluate from the detector, the needle being connected to the detector via the flow path switching valve in the second state wherein:

the syringe causes the needle to discharge the sample stored in the storage unit toward the separation column, in the first state, the first line is closed, and the detector is connected through the second line to a drain, and in the second state, the detector is connected through the first line to the needle, and the second line is connected to the syringe.

* * * * *